(12) United States Patent
Grancharov et al.

(10) Patent No.: US 10,891,942 B2
(45) Date of Patent: Jan. 12, 2021

(54) UNCERTAINTY MEASURE OF A MIXTURE-MODEL BASED PATTERN CLASSIFER

(71) Applicant: Telefonaktiebolaget LM Ericsson (publ), Stockholm (SE)

(72) Inventors: Volodya Grancharov, Solna (SE); Sigurdur Sverrisson, Kungsängen (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 190 days.

(21) Appl. No.: 16/066,523

(22) PCT Filed: Mar. 3, 2016

(86) PCT No.: PCT/EP2016/054581
§ 371 (c)(1),
(2) Date: Jun. 27, 2018

(87) PCT Pub. No.: WO2017/148521
PCT Pub. Date: Sep. 8, 2017

(65) Prior Publication Data
US 2019/0013014 A1 Jan. 10, 2019

(51) Int. Cl.
*G10L 15/14* (2006.01)
*G10L 15/00* (2013.01)
(Continued)

(52) U.S. Cl.
CPC ............ *G10L 15/14* (2013.01); *G06K 9/6288* (2013.01); *G06N 7/005* (2013.01); *G06N 20/00* (2019.01);
(Continued)

(58) Field of Classification Search
USPC .................................................. 704/236–240
See application file for complete search history.

(56) References Cited

U.S. PATENT DOCUMENTS

2009/0132442 A1  5/2009  Subramaniam et al.
2010/0004926 A1  1/2010  Neoran et al.
(Continued)

FOREIGN PATENT DOCUMENTS

EP   1883040 A1   1/2008
WO   2012103625 A1  8/2012

OTHER PUBLICATIONS

International Search Report and Written Opinion dated Aug. 4, 2016 for International Application No. PCT/EP2016/054581 filed Mar. 3, 2016, consisting of 10-pages.

*Primary Examiner* — Leonard Saint Cyr
(74) *Attorney, Agent, or Firm* — Christopher & Weisberg, P. A.

(57) ABSTRACT

There are provided mechanisms for determining an uncertainty measure of a mixture-model based parametric classifier. A method is performed by a classification device. The method includes obtaining a short-term frequency representation of a multimedia signal. The short-term frequency representation defines an input sequence. The method includes classifying the input sequence to belong to one class of at least two available classes using the parametric classifier. The parametric classifier has been trained with a training sequence. The method includes determining an uncertainty measure of the classified input sequence based on a relation between posterior probabilities of the input sequence and posterior probabilities of the training sequence.

20 Claims, 5 Drawing Sheets

(51) Int. Cl.
*G06K 9/62* (2006.01)
*G06N 20/00* (2019.01)
*G06N 7/00* (2006.01)
*G10L 15/06* (2013.01)
*G10L 25/24* (2013.01)
G10L 25/51 (2013.01)
G10L 15/183 (2013.01)
G10L 15/08 (2006.01)

(52) U.S. Cl.
CPC .......... *G10L 15/005* (2013.01); *G10L 15/063* (2013.01); *G10L 25/24* (2013.01); *G06K 2009/6294* (2013.01); *G10L 15/183* (2013.01); *G10L 25/51* (2013.01); *G10L 2015/088* (2013.01)

(56) References Cited

U.S. PATENT DOCUMENTS

| | | |
|---|---|---|
| 2010/0138223 A1 | 6/2010 | Koshinaka |
| 2014/0257820 A1 | 9/2014 | Laperdon et al. |
| 2015/0088509 A1 | 3/2015 | Gimenez et al. |
| 2015/0112682 A1 | 4/2015 | Rodriguez et al. | ary Measure of a
UNCERTAINTY MEASURE OF A MIXTURE-MODEL BASED PATTERN CLASSIFER

CROSS-REFERENCE TO RELATED APPLICATIONS

This application is a Submission Under 35 U.S.C. § 371 for U.S. National Stage Patent Application of International Application Number: PCT/EP2016/054581, filed Mar. 3, 2016 entitled "UNCERTAINTY MEASURE OF A MIXTURE-MODEL BASED PATTERN CLASSIFIER," the entirety of which is incorporated herein by reference.

TECHNICAL FIELD

Embodiments presented herein relate to a method, a classification device, a computer program, and a computer program product for determining an uncertainty measure of a mixture-model based parametric classifier.

BACKGROUND

In general terms, audio mining is a technique by which the content of an audio signal (comprising an audio waveform) can be automatically analyzed and searched. It is commonly used in the field of automatic speech recognition, where the analysis tries to identify any speech within the audio. The audio signal will typically be processed by a speech recognition system in order to identify word or phoneme units that are likely to occur in the spoken content. In turn, this information can be used to identify a language used in the audio signal, which speaker that is producing the audio waveform, the gender of the speaker producing the audio waveform, etc. This information may either be used immediately in pre-defined searches for keywords, languages, speakers, gender (a real-time word spotting system), or the output of the speech recognizer may be stored in an index file. One or more audio mining index files can then be loaded at a later date in order to run searches for any of the above parameters (keywords, languages, speakers, gender, etc.).

FIG. 1 is a schematic diagram illustrating a classification device 100 according to prior art. The classification device 100 comprises a classifier module 110 and a training module 120. The classifier module 110 is configured to perform classification on an input sequence x. Let the input sequence x consists of N vectors, and hence be written as:

$$x=\{x_n\}_{n=1}^{N} \quad (1)$$

All vectors $x_n$ are D-dimensional, i.e., $x_n=[x_n^1, x_n^2, \ldots, x_n^D]$. The input sequence x is assumed to belong to one of M classes as represented by $\omega_m$:

$$\{\omega_m\}_{m=1}^{M} \quad (2)$$

The exact class to which the input sequence x belongs is unknown. The classifier module 110 is configured to assign the input sequence x to the correct class $\omega_{m^*}$. This can be formalized through configuring the classifier module 110 to implement discriminant functions:

$$\{g_m(x)\}_{m=1}^{M} \quad (3)$$

The discriminant functions are by the classifier module 110 used to produce an index of the most likely class $\omega_{m^*}$ for the input sequence x as:

$$m^* = \underset{m}{\operatorname{argmax}}\{g_m(x)\} \quad (4)$$

Here, the function argmax represents the argument (i.e., the value $m^* \in \{1, 2, \ldots, M\}$) that maximizes the function $g_m(x)$.

For probabilistic parametric classifiers 110 the form of the discriminant function is most often defined to be the log-likelihood, expressed as $\log(P(x|\omega_m))$, of the input sequence (i.e., the log-likelihood of observing the input sequence x given the class $\omega_m$) expressed as $$g_m(x)=\log(P(x|\omega_m)) \quad (5)$$

To simplify presentation it is assumed that all classes $\omega_m$ are equally probable, i.e., that all a priori probabilities are equal, i.e., that $P(\omega_1)=P(\omega_2)=\ldots=P(\omega_M)$. The skilled person would be able to extend the presentation to un-equal a priori probabilities.

It is assumed that the probability of the input sequence x could be written as product of probabilities of individual vectors $x_n$. Further, for mixture-models, these probabilities are modeled as superposition of components, or classes, denoted $\Phi_{m,k}$. That is, $P(x_n|\omega_m)$ is a weighted sum of K clusters $\Phi_{m,k}$, with weights $u_{m,k}$. This leads to an expression of the discriminant functions (log-likelihood) for the mixture-model based pattern classification as follows:

$$g_m(x) = \sum_{n=1}^{N} \log\left(\sum_{k=1}^{K} u_{m,k}\Phi_{m,k}(x_n|\omega_m)\right), \quad (6)$$

$$m=1, \ldots, M$$

In its most commonly used form the clusters $\Phi_{m,k}$ are Gaussian densities determined by set of means $\mu_{m,k}$ and covariances $\Sigma_{m,k}$:

$$\Phi_{m,k}\left(x_n|\mu_{m,k}, \sum_{m,k}\right) = \frac{\exp\left\{-\frac{1}{2}(x_n-\mu_{m,k})^T \sum_{m,k}^{-1}(x_n-\mu_{m,k})\right\}}{(2\pi)^{\frac{D}{2}}|\Sigma_{m,k}|^{\frac{1}{2}}} \quad (7)$$

Here, exp denotes the exponential function. The structure introduced in Equations (4)-(7) defines a commonly used pattern classification techniques based on Gaussian Mixture Models (GMM). At a training stage, as performed by the training module 120, the parameters for each class $\omega_m$:$\{u_{m,k}, \mu_{m,k}, \Sigma_{m,k}\}_{k=1}^{K}$ are obtained from the part of a training sequence y that is associated with that class. During classification, as performed by the classifier module 110, for a given input sequence x the classifier module 110 implements Equation (6) for all m, finds the largest $g_m(x)$, and determines the index of the optimal class by implementing Equation (4).

Under the assumptions that the mixture model can capture the probability density function of the input sequence x, that the model parameters are correct, and that the length of the input sequence x approaches infinity, the mixture model based classifier approaches optimal classification performance.

However, for many practical applications the classification is performed on finite-length input sequences. For example, statistics in a speech signal are rarely stationary more than 200 ms, which can imply that the classification decision has to be taken with at most 20 feature vectors. In such a case the optimality when using a mixture model based classifier is not guaranteed. Further, it could be challenging to deduce the degree of uncertainty in the classification decision based on the likelihood $P(x|\omega_m)$ itself, because it depends on the shape of the probability density function, the particular input sequence x, etc.

Hence, there is still a need for an improved measure of the uncertainty of the classifier 110.

SUMMARY

An object of embodiments herein is to provide an efficient measure of the uncertainty of a mixture-model based parametric classifier.

According to a first aspect there is presented a method for determining an uncertainty measure of a mixture-model based parametric classifier. The method is performed by a classification device. The method comprises obtaining a short-term frequency representation of a multimedia signal. The short-term frequency representation defines an input sequence. The method comprises classifying the input sequence to belong to one class of at least two available classes using the parametric classifier. The parametric classifier has been trained with a training sequence. The method comprises determining an uncertainty measure of the thus classified input sequence based on a relation between posterior probabilities of the input sequence and posterior probabilities of the training sequence.

Advantageously this provides an efficient measure of the uncertainty of a mixture-model based parametric classifier.

Advantageously this uncertainty measure can be used to give a degree of confidence in classification performed by a mixture-model based parametric classifier on short input sequences and where the expected source statistics might be disturbed.

According to a second aspect there is presented a classification device for determining an uncertainty measure of a mixture-model based parametric classifier. The classification device comprises processing circuitry. The processing circuitry is configured to cause the classification device to obtain a short-term frequency representation of a multimedia signal. The short-term frequency representation defines an input sequence. The processing circuitry is configured to cause the classification device to classify the input sequence to belong to one class of at least two available classes using the parametric classifier. The parametric classifier has been trained with a training sequence. The processing circuitry is configured to cause the classification device to determine an uncertainty measure of the thus classified input sequence based on a relation between posterior probabilities of the input sequence and posterior probabilities of the training sequence.

According to a third aspect there is presented a classification device for determining an uncertainty measure of a mixture-model based parametric classifier. The classification device comprises processing circuitry and a computer program product. The computer program product stores instructions that, when executed by the processing circuitry, causes the classification device to perform operations, or steps. The operations, or steps cause the classification device to obtain a short-term frequency representation of a multimedia signal. The short-term frequency representation defines an input sequence. The operations, or steps cause the classification device to classify the input sequence to belong to one class of at least two available classes using the parametric classifier. The parametric classifier has been trained with a training sequence. The operations, or steps cause the classification device to determine an uncertainty measure of the thus classified input sequence based on a relation between posterior probabilities of the input sequence and posterior probabilities of the training sequence.

According to a fourth aspect there is presented a classification device for determining an uncertainty measure of a mixture-model based parametric classifier. The classification device comprises an obtain module configured to obtain a short-term frequency representation of a multimedia signal. The short-term frequency representation defines an input sequence. The classification device comprises a classify module configured to classify the input sequence to belong to one class of at least two available classes using the parametric classifier. The parametric classifier has been trained with a training sequence. The classification device comprises a determine module configured to determine an uncertainty measure of the thus classified input sequence based on a relation between posterior probabilities of the input sequence and posterior probabilities of the training sequence.

According to a fifth aspect there is presented a computer program for determining an uncertainty measure of a mixture-model based parametric classifier, the computer program comprising computer program code which, when run on classification device, causes classification device to perform a method according to the first aspect.

According to a sixth aspect there is presented a computer program product comprising a computer program according to the fifth aspect and a computer readable storage medium on which the computer program is stored.

It is to be noted that any feature of the first, second, third, fourth, fifth and sixth aspects may be applied to any other aspect, wherever appropriate. Likewise, any advantage of the first aspect may equally apply to the second, third, fourth, fifth, and/or sixth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
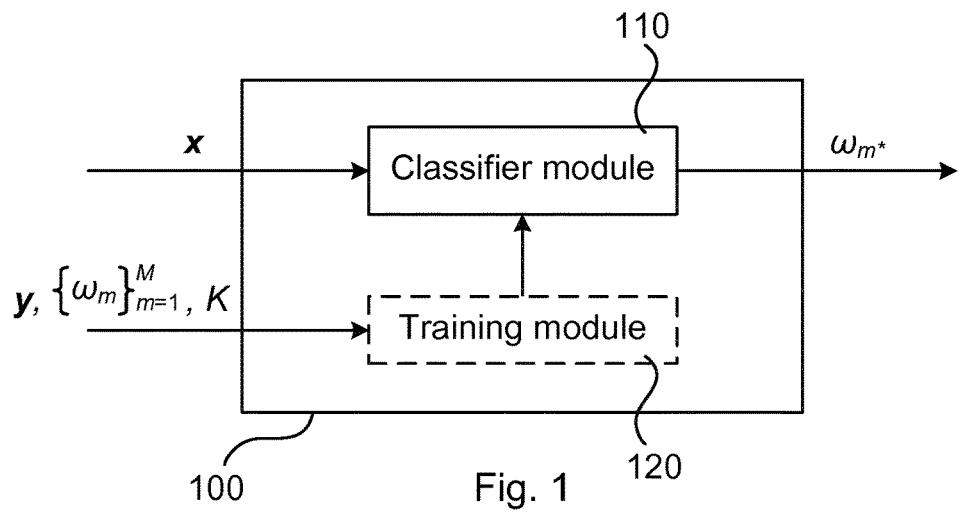
FIG. 1 is a schematic diagram illustrating a classification device according to prior art.

With reference to FIG. 1, the classifier module 110 represents a parametric classifier and determines a most likely class $\omega_{m^*}$, for a given input sequence x. The present inventive concept is related to determining how certain the classifier module 110 is that the most likely class is indeed $\omega_{m^*}$. In more detail, according to embodiments disclosed herein there is provided determination of an uncertainty measure for mixture-model based classifiers 110 that operate on short feature sequences. The uncertainty measure is based on normalized per-cluster posterior probabilities.

Figure 2A:
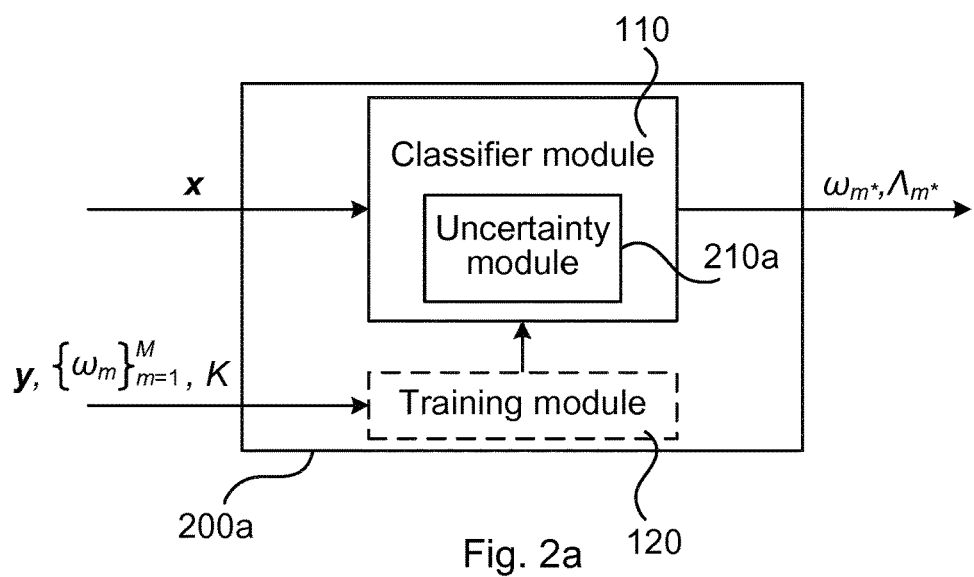
FIGS. 2a and 2b are schematic diagrams illustrating a classification device according to embodiments.
Figure 2B:
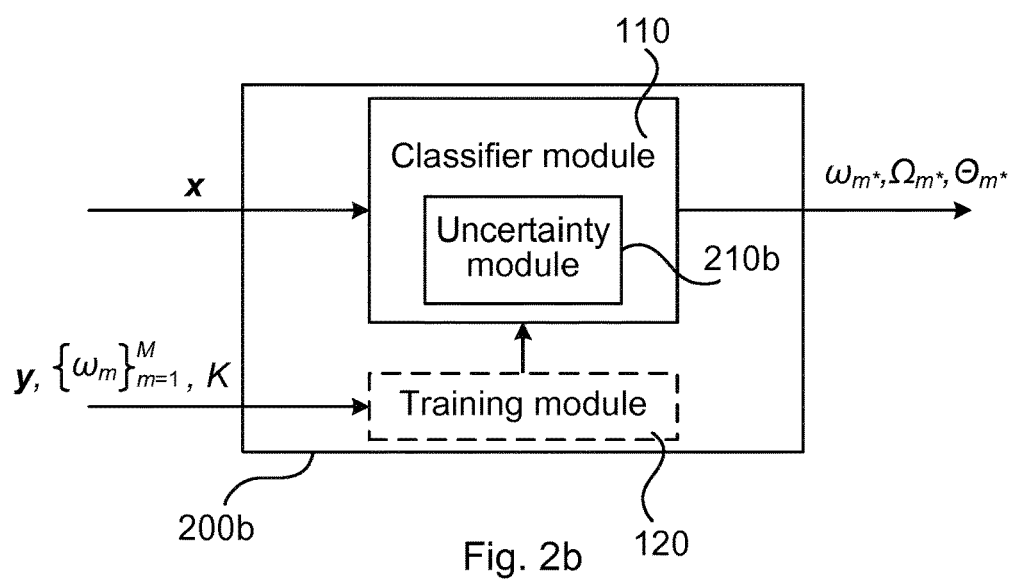

Reference is here made to FIGS. 2a and 2b being schematic diagrams illustrating classification devices 200a, 200b according to embodiments. In relation to the classification device Dm each of the classification devices 200a, 200b also comprises a classifier, as represented by classifier module 110, and a training module 120. The functionalities of these have been described above and description thereof is therefore omitted. However, in addition thereto each of the classification devices 200a, 200b further comprises an uncertainty module 210a, 210b. The uncertainty module 210a, 210b is configured to determine an uncertainty measure of the mixture-model based parametric classifier 110. Further details of the uncertainty module 210a, 210b will be disclosed below.

As noted above, it could be challenging to deduce the degree of uncertainty in the classification decision based on the likelihood $P(x|\omega_m)$ itself, because it depends on the shape of the probability density function, the particular input sequence x, etc.

Another option is to use the posterior probabilities $P(\omega_m|x)$, which represent the probability of the class being $\omega_m$ given the input sequence x, also considering the impact of the input sequence x being of finite length. For example, the input sequence x could correspond a length of 200 ms.

Figure 4:
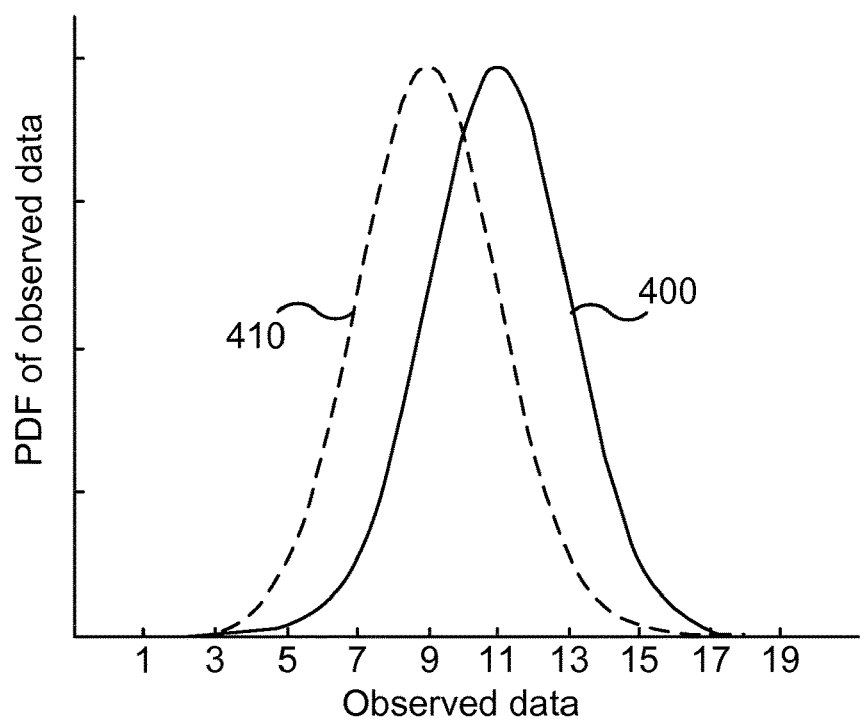
Figure 5:
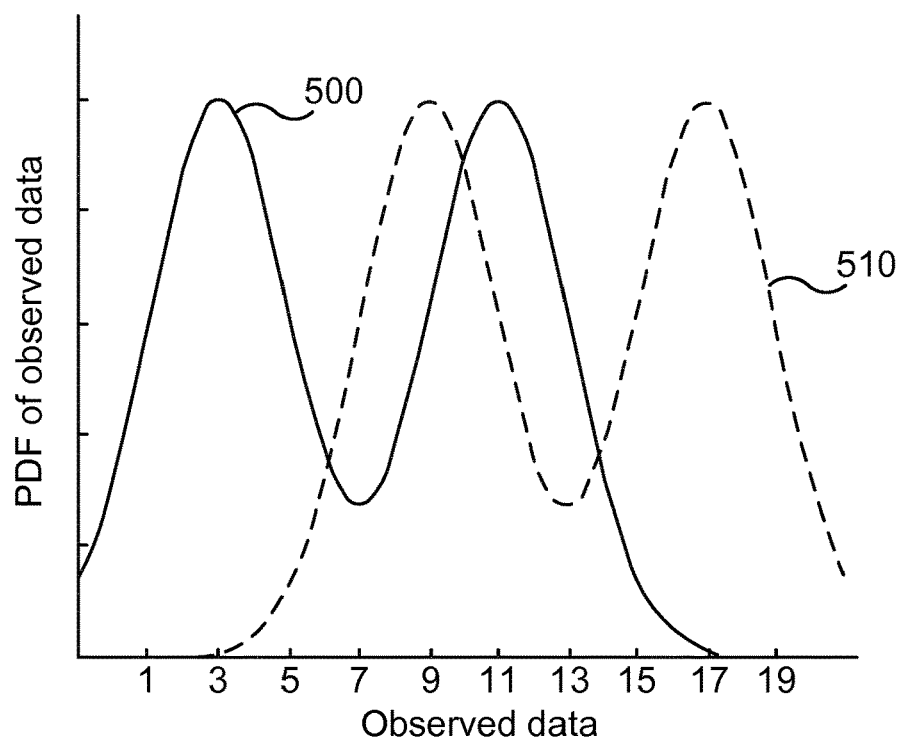

An example of the impact of the finite length of the input sequence x is presented in FIGS. 4 and 5. FIG. 4 schematically illustrates probability density functions 400, 410 of two classes $\omega_1$, $\omega_2$ for a first scenario, and FIG. 5 schematically illustrates probability density functions 500, 510 of two classes $\omega_1$, $\omega_2$ for a second scenario. In FIG. 4 the posterior probability $P(\omega_1|x)$ will converge to $P(\omega_1|x^{inf})=0.6$ if an infinitely long input sequence $x^{inf}$ is generated from class $\omega_1$, and one cannot become more confident in the classification decision by adding any more data. In FIG. 5 the corresponding number will be $P(\omega_1|x^{inf})=0.8$ because the classes are better separated. The problem occurs if a short sequence x, produced by $\omega_1$ in FIG. 5 is to be classified and where the received so far points lie in the overlapping region (i.e., between numerical values 3 and 17 on the x-axis in FIG. 5). Now $P(\omega_1|x)$ is close to 0.6, and it is difficult to know if this is because the classes are overlapping (as in FIG. 4) or if this is just an effect of a short sequence being classified, and thus whether any more data will help to increase the decision confidence to 0.8.

In conclusion, if the models are complex (consisting of many clusters) and the input sequence x is short, $P(\omega_m|x)$ will be dependent on which clusters are associated to the particular points (as defined by vectors $x_n$) in x. Since the model is global (a GMM outputs only a weighted sum of votes from individual clusters) the classifier 110 cannot capture how the short sequence factor will impact the certainty of the classification $P(\omega_m|x)$.

The embodiments disclosed herein thus relate to determining an uncertainty measure of the mixture-model based parametric classifier 110. In order to obtain such an uncertainty measure there is provided a classification device 200a, 200b, a method performed by the classification device 200a, 200b, a computer program product comprising code, for example in the form of a computer program, that when run on a classification device 200a, 200b, causes the classification device 200a, 200b to perform the method.

Figure 6:
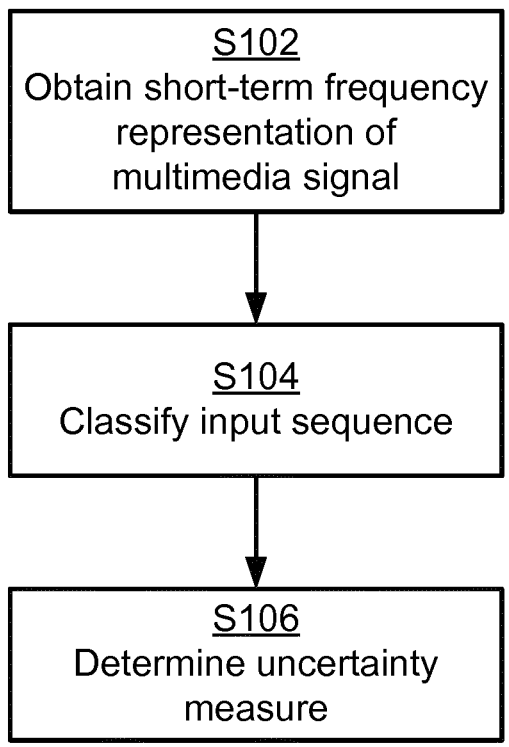
FIGS. 6 and 7 are flowcharts of methods according to embodiments.
Figure 7:
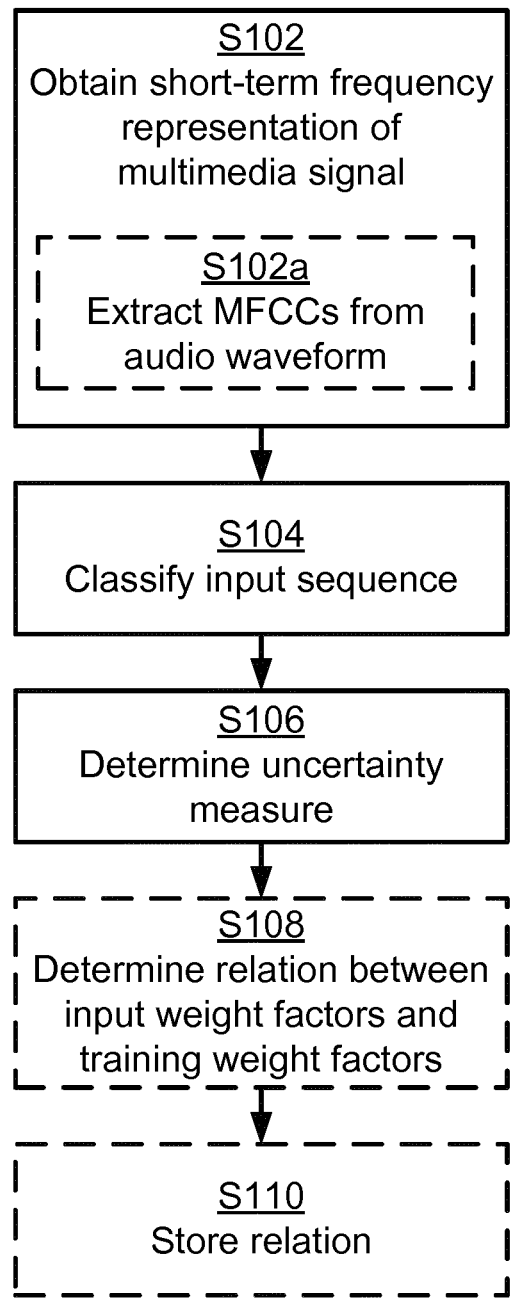

FIGS. 6 and 7 are flow charts illustrating embodiments of methods for determining an uncertainty measure of a mixture-model based parametric classifier 110. The methods are performed by the classification device 200a, 200b. The methods are advantageously provided as computer programs.

Reference is now made to FIG. 6 illustrating a method for determining an uncertainty measure of a mixture-model based parametric classifier 110 as performed by the classification device 200a, 200b according to an embodiment.

S102: The classification device 200a, 200b obtains a short-term frequency representation of a multimedia signal. Examples of the short-term frequency representation and examples of the multimedia signal will be provided below. The short-term frequency representation defines an input sequence x.

S104: The classification device 200a, 200b classifies the input sequence x to belong to one class $\omega_{m^*}$ of at least two available classes $\omega_1$, $\omega_2$. The input sequence x is classified using the parametric classifier 110. The parametric classifier 110 has been trained with a training sequence y. In this respect the parametric classifier 110 implements operations which as such are known in the art for classifying the input sequence x into one class $\omega_{m^*}$, of the at least two available classes $\omega_1$, $\omega_2$.

S106: The classification device 200a, 200b determines an uncertainty measure of the thus classified input sequence x. The uncertainty measure is based on a relation between posterior probabilities of the input sequence x and posterior probabilities of the training sequence y. Examples of uncertainty measures will be provided below. Step S106 can be implemented by the uncertainty module 210a, 210b.

Determination of the uncertainty measure, as performed by the uncertainty module 210a, 210b, can thereby be added to a legacy classification scheme, as performed by the parametric classifier 110, without modifying the core classification determination implemented by the parametric classifier 110.

The determination of the uncertainty measure thus requires the classification device 200a, 200b to obtain the posterior probabilities of the input sequence x and to obtain the posterior probabilities of the training sequence y.

Embodiments relating to further details of determining the uncertainty measure of a mixture-model based parametric classifier 110 as performed by the classification device 200a, 200b will now be disclosed. Reference is now made to FIG. 7 illustrating methods for determining an uncertainty measure of a mixture-model based parametric classifier 110 as performed by the classification device 200a, 200b according to further embodiments. Steps S102, S104, and S106 are performed as described above with reference to FIG. 6 and a repeated description of those steps is therefore omitted.

There could be different kinds of parametric classifiers 110. According to an embodiment the parametric classifier 110 is based on Gaussian Mixture Models (GMMs).

There could be different properties that the at least two available classes $\omega_1$, $\omega_2$ represent. For example, the classification of the input sequence x can be performed to classify languages, speaker, and/or genders. Hence, according to an embodiment each of the at least two available classes $\omega_1$, $\omega_2$ represents a unique language, a unique speaker, or a unique gender.

There could be different ways for the classification device 200a, 200b to obtain the short-term frequency representation of the multimedia signal as in step S102. According to an embodiment the short-term frequency representation is provided by mel-frequency cepstral components (MFCCs). In this respect, the MFCCs are coefficients that collectively make up a mel-frequency cepstrum (MFC). The MFC is a representation of the short-term power spectrum of an audio waveform of the multimedia signal, based on a linear cosine transform of a log power spectrum on a nonlinear mel scale of frequency. According to one embodiment the MFCCs are made readily available to the classification device 200a, 200b. Hence, this embodiment requires a module configured to provide the MFCCs from an audio waveform of the multimedia signal. According to another embodiment the classification device 200a, 200b receives the audio waveform and extracts the MFCCs from the audio waveform. Hence, according to an embodiment the classification device 200a, 200b is configured to perform step S102a:

Step S102a: The classification device 200 extracts the MFCCs from the audio waveform of the multimedia signal. How to extract MFCCs from an audio waveform is as such known in the art and further description thereof is therefore omitted. Step S102a is performed as part of step S102.

Assuming that the input sequence x is divided into input vectors $x_n$, each input vector $x_n$, can then correspond to a vector of MFCCs. Assuming that the audio waveform is composed of frames, there is then one vector of MFCCs per frame.

There could be different types of audio waveforms. According to an embodiment the audio waveform represents a speech signal.

There could be different types of audio classification of which the herein disclosed methods for non-parametric audio classification could be part of. According to an embodiment the step S102 of obtaining, the step S104 of classifying, and the step S106 of determining are performed in an audio mining application. In this respect, when uncertainty is detected in a phone recognition in an automatic speech recognition module, a language model could be adapted to compensate for the detected uncertainty. In another example in a video or audio mining application the length of the input sequence x could be extended until a desired level of certainty is reached.

Further, since the discriminant function, as defined in Equation (6), is additive in terms of the input sequence x, i.e., $g_m(x_1, \ldots, x_N) = g_m(x_1, \ldots, x_{N-1}) + g_m(x_N)$, delaying decision and accommodating more data is straightforward and does not require re-computing of the past contributions.

There can be different kinds of uncertainty measures. According to an embodiment the uncertainty measure describes a deviation from an optimal performance of the parametric classifier 110. According to some aspects the optimal performance is based on the posterior probabilities of the training sequence y.

There can be different kinds of posterior probabilities. According to an embodiment there is one posterior probability of the input sequence x for each available class $\omega_1$, $\omega_2$. The posterior probability for a given class $\omega_m$ then represents the probability of the given class $\omega_m$ for the input sequence x. Further, according to an embodiment there is one posterior probability of the training sequence y for each available class $\omega_1$, $\omega_2$. The posterior probability for a given class $\omega_m$ then represents the probability of the given class $\omega_m$ for the training sequence y. Examples of how the posterior probabilities can be determined will be provided below.

As will be further disclosed below, according to some embodiments the uncertainty measure is defined as minimum of 1 and a ratio between the posterior probabilities of the input sequence x and the posterior probabilities of the training sequence y.

In the following it is assumed that the total set of parameters $\{u_{m,k}, \mu_{m,k}, \Sigma_{m,k}\}_{k=1}^{K}$ for all M classes are already available. These parameters could be estimated by the classification device 200a, 200b implementing an Expectation Maximization algorithm. Next will be described how to determine the uncertainty measure associated with these classes.

Embodiments relating to the operations performed by the uncertainty module 210a will now be disclosed with reference to the classification device 200a of FIG. 2a. According to the embodiment of FIG. 2b the uncertainty measure is based on global posterior probabilities.

According to the embodiment of FIG. 2a the posterior probabilities of the input sequence x represent probability of classifying the input sequence x into class $\omega_m$ given the input sequence x. Further, the posterior probabilities of the training sequence y represent probability of classifying the training sequence y into class $\omega_m$ given that the training sequence y belongs to class $\omega_m$.

The the embodiment of FIG. 2a is based on normalization of the expected posterior probabilities. The classification device 200a determines a normalization factor $\gamma_m^{opt}$ relating to the training sequence y. Denote by $y_m$ the training set that belongs to class $\omega_m$. The normalization factor $\gamma_m^{opt}$ can be stored in an offline stage. Two ways in which the classification device 200a could determine the normalization factor $\gamma_m^{opt}$ will be described next.

According to a first example, if the entire training sequence y is available, the classification device 200a determines the normalization factor $\gamma_m^{opt}$ by implementing Equation (8):

$$\gamma_m^{opt} = \frac{\exp(g_m(y_m))}{\sum_{j=1}^{M} \exp(g_j(y_j))}, m = 1 \ldots M \tag{8}$$

According to a second example, if the entire training sequence y is available, or it is computationally prohibited for the classification device 200a to implement Equation (6), the classification device 200a is configured to determine $\gamma_m^{opt}$ by calculating the Bhattacharyya bound on per-cluster basis and sum over all clusters and classes. This will give the total probability of error, which could be used as an estimate of $(1-P(\omega_m|y^{inf}))$, where $y^{inf}$ denotes a training sequence of infinite length.

The classification device 200a is configured to, at the classification stage, for the given input sequence x, obtain the index of the most likely class m* by implementing Equation (4) and then determine an adaptive factor $\gamma_{m*}$ associated with the particular input sequence x by implementing Equation (9):

$$\Upsilon_{m^*} = \frac{\exp(g_m(x))}{\sum_{j=1}^{M} \exp(g_j(x))} \quad (9)$$

The classification device 200a is then configured to determine the uncertainty measure $\Lambda_{m*}$ regarding the classification made in step S104 that the most likely class for the input sequence x is $\omega_{m*}$ by implementing Equation (10):

$$\Lambda_{m^*} = \min\left(\frac{\Upsilon_{m^*}}{\Upsilon_{m^*}^{opt}}, 1\right) \quad (10)$$

Hence, according to the embodiment of FIG. 2a, $\Lambda_{m*}$ as determined in Equation (10) is based on a relation between posterior probabilities of the input sequence x and posterior probabilities of the training sequence y and thus represents the uncertainty measure determined in step S106.

Embodiments relating to the operations performed by the uncertainty module 210b will now be disclosed with reference to the classification device 200a of FIG. 2b.

According to the embodiment of FIG. 2b all posterior probabilities are determined as weighted sums of respective per-cluster posterior probabilities. Hence, according to the embodiment of FIG. 2b the uncertainty measure is based on per-cluster posterior probabilities.

From Equations (6)-(7) it follows that the likelihood is roughly determined by the association of $x_n$ to the particular clusters $\Phi_{m,k}$. For example, by assuming that all covariances are equal, then this association would mean that the distance defined by $|x_n-\mu_k|$ is smallest, which also means that $\Phi_{m,k}(x_n)$ is largest among all clusters. Therefore, for posterior probabilities at a given cluster $\Phi_{m,k}$ the notation $P(\omega_m|\mu_{m,k})$ is used, where $\mu_{m,k}$ is the mean of the cluster $\Phi_{m,k}$.

The classification device 200b determines posterior probabilities for each cluster $\Phi_{m,k}$. The classification device 200b could pre-store the determined posterior probabilities. The posterior probabilities could be determined analytically or empirically, similarly to the description above. For example, in order to perform an empirical determination of the posterior probability for a cluster with mean $\mu_{m,k}$ the classification device 200b is configured to perform the following operations directly on the training sequence y. The classification device 200b stores in variable $L_{m,k}$, for each cluster the number of training data points in the training sequence y that belong to cluster $\Phi_{m,k}$. The classification device 200b stores in a variable $L_{m,k}^{\omega_m}$ the number of points with labels of class $\omega_m$ in the training sequence y that belong to cluster $\Phi_{m,k}$. The classification device 200b then determines the posterior probabilities $P(\omega_m|\mu_{m,k})$ of the training sequence y by determining the ratio between $L_{m,k}^{\omega_m}$ and $L_{m,k}$, i.e., by implementing Equation (11):

$$P(\omega_m | \mu_{m,k}) = \frac{L_{m,k}^{\omega_m}}{L_{m,k}} \quad (11)$$

In this respect, a cluster $\Phi_{m,k}$ that is maximized by many points from a class $\omega_{j\neq m}$ relative to the data points generated from class $\omega_m$ does not have much discriminative power by itself; that cluster simply consists of points from different classes. At the same time, a cluster $\Phi_{m,k}$ that is maximized by many points from its own class class $\omega_m$ relative to other classes $\omega_{j\neq m}$ has a lot of discriminative power.

According to the embodiment of FIG. 2b it is assumed that each of the at least two available classes $\omega_1$, $\omega_2$ is associated with its own set of clusters $\Phi_{m,k}$. Further, the training sequence y is divided into training vectors $y_n$. The posterior probabilities of the training sequence y are then based on training weight factors $u_{m,k}$ that represent how many of the training vectors $y_n$, are associated to each cluster $\Phi_{m,k}$ of each class $\omega_m$. In more detail, the training weight factors $u_{m,k}$ are by the classification device 200b used to determine a normalization factor $\Psi_m^{opt}$ (one per-model) by implementing Equation (12):

$$\Psi_m^{opt} = \sum_{k=1}^{K} u_{m,k} P(\omega_m | \mu_{m,k}) \quad (12)$$

The normalization factor $\Psi_m^{opt}$ thus relate to performance of the classifier 110 when performing classification of the training sequence y. As will be disclosed below, the normalization factor $\Psi_m^{opt}$ is by the classification device 200b used when determining the uncertainty measure of the classification of the the input sequence x.

At the classification of the input sequence x the classifier 110 implements Equation (4) to obtain the index m* of the most likely class $\omega_{m*}$. The classification device 200b then determines an uncertainty measure associated with that decision.

According to the embodiment of FIG. 2b it is assumed that the input sequence x is divided into input vectors $x_n$. Further, the posterior probabilities of the input sequence x are based on input weight factors $v_{m*,k}$ that represent how many of the input vectors $x_n$ are associated to each cluster $\Phi_{m,k}$ of the class $\omega_{m*}$ to which the input sequence x has been classified to belong, normalized with a total length of the input sequence x. Each input weight factor $v_{m*,k}$ thus represents a count of how many input vectors $x_n$ could be associated to each cluster $\Phi_{m,k}$ of the selected class $\omega_{m*}$, normalized with the total length of the input sequence x. If the input sequence x would be of infinite length, the input weight factors $v_{m*,k}$ are expected to converge to the cluster weights $u_{m,k}$ obtained at the training stage. However, with short sequences there might be significant deviations of these statistics.

The classification device 200b is then configured to determine an adaptive factor $\Psi_{m*}$ associated with the particular input sequence x by implementing Equation (13):

$$\Psi_{m^*} = \sum_{k=1}^{K} v_{m^*,k} P(\omega_{m^*} \mid \mu_{m^*,k}) \quad (13)$$

The classification device 200b is then configured to determine the uncertainty measure $\Omega_{m^*}$ regarding the classification made in step S104 that the most likely class for the input sequence x is $\omega_{m^*}$ by implementing Equation (14):

$$\Omega_{m^*} = \min\left(\frac{\Psi_{m^*}}{\Psi_{m^*}^{opt}}, 1\right) \quad (14)$$

Hence, according to the embodiment of FIG. 2b, $\Omega_{m^*}$ as determined in Equation (14) is based on a relation between posterior probabilities of the input sequence x and posterior probabilities of the training sequence y and thus represents the uncertainty measure determined in step S106.

The classification device 200b is optionally configured to determine an additional indicator $\Theta_{m^*}$, by implementing Equation (15)

$$\Theta_{m^*} = \begin{bmatrix} P(\omega_{m^*} \mid \mu_{m^*,1}) & \cdots & P(\omega_{m^*} \mid \mu_{m^*,K}) \\ \dfrac{v_{m^*,1}}{u_{m^*,1}} & \cdots & \dfrac{v_{m^*,K}}{u_{m^*,K}} \end{bmatrix} \quad (15)$$

The upper-most row in $\Theta_{m^*}$ is defined by the pre-stored posterior probabilities of the most likely class, while the entries of the lower-most row provides information about the distortion in the data statistics due to a limited number of samples (caused by a classification of an input sequence x of short length). According to an embodiment the classification device 200b is configured to perform steps S108 and S110 in order to implement Equation (15):

S108: The classification device 200b determines, for each cluster $\Phi_{m,k}$ for k=1, ..., K, a relation $\Theta_{m^*}$ between the input weight factors $v_{m^*,k}$ and training weight factors $u_{m^*,k}$ for the class $\omega_{m^*}$ to which the input sequence x has been classified to belong.

S110: The classification device 200b stores the thus determined relation $\Theta_{m^*}$.

In general terms, when the uncertainty measure (either $\Omega_{m^*}$ or $\Lambda_{m^*}$) of classifying the input sequence x into class $\omega_{m^*}$ has a numerical value that is close to 1 there is a high certainty in the classification decision, and the more the uncertainty measure decreases the more uncertain the classification decision becomes.

A non-limiting illustrative example of at least some of the herein disclosed embodiments will be provided next. According to the illustrative example there are two classes $\omega_1$, $\omega_2$ with two clusters each, as represented by the cluster parameters $\mu_{m,k}$ representing the mean values of each cluster. Table 1 illustrates numerical values of all posterior probabilities. However, as the skilled person understands, only values for one of the classes need to be stored.

TABLE 1

Example values of posterior probabilities $P(\omega_m \mid \mu_{m,k})$ for two classes, each class comprising two clusters.

| Classes and clusters | | Posterior probabilities | |
| --- | --- | --- | --- |
| $\omega_1$: | $\mu_{1,1} = 5$ | $P(\omega_1\mid\mu_{1,1}) = 0.85$ | $P(\omega_2\mid\mu_{1,1}) = 0.15$ |
| | $\mu_{1,2} = 11$ | $P(\omega_1\mid\mu_{1,2}) = 0.55$ | $P(\omega_2\mid\mu_{1,2}) = 0.45$ |

TABLE 1-continued

Example values of posterior probabilities $P(\omega_m \mid \mu_{m,k})$ for two classes, each class comprising two clusters.

| Classes and clusters | | Posterior probabilities | |
| --- | --- | --- | --- |
| $\omega_2$: | $\mu_{2,1} = 9$ | $P(\omega_1\mid\mu_{2,1}) = 0.45$ | $P(\omega_2\mid\mu_{2,1}) = 0.55$ |
| | $\mu_{2,2} = 15$ | $P(\omega_1\mid\mu_{2,2}) = 0.15$ | $P(\omega_2\mid\mu_{2,2}) = 0.85$ |

Figure 3:
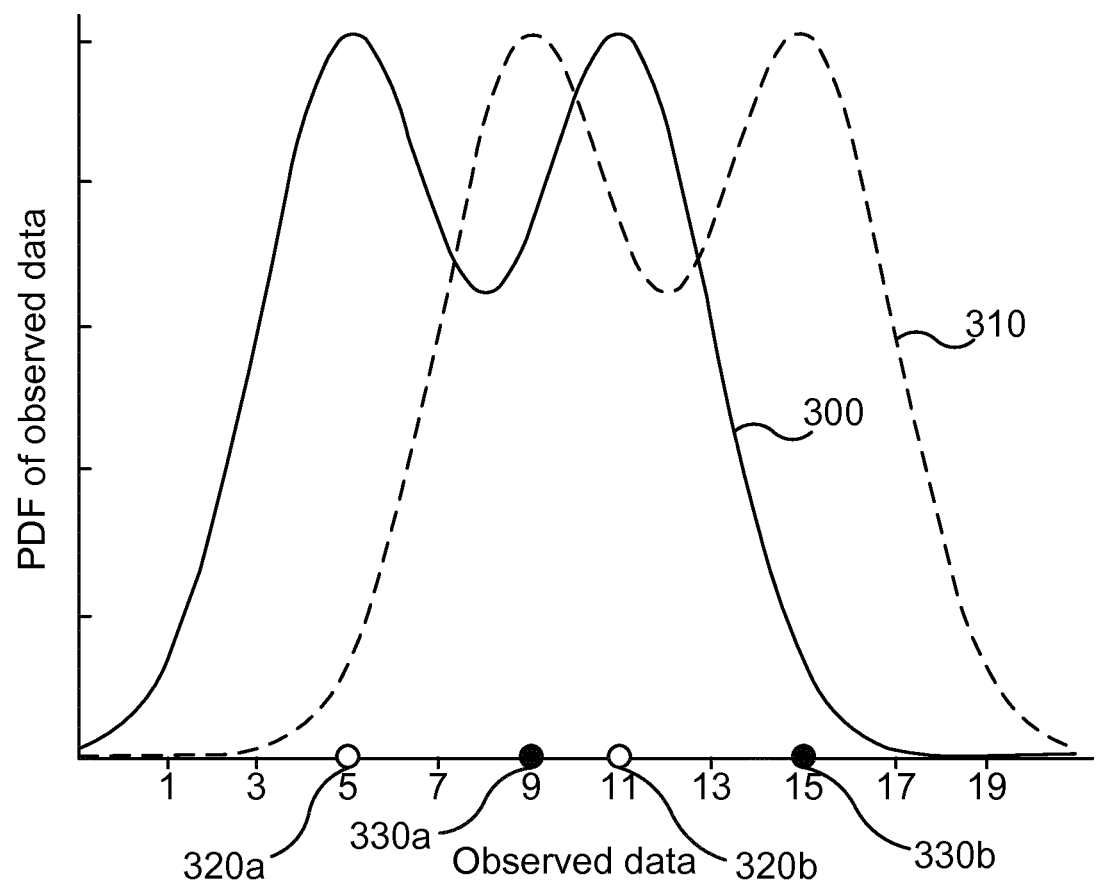
FIGS. 3, 4, and 5 schematically illustrates probability density functions.

Reference is also made to FIG. 3. FIG. 3 schematically illustrates the probability density functions 300, 310 of the two classes $\omega_1$, $\omega_2$ together with the mean value $\mu_{1,1}$=5 at reference numeral 320a, the value $\mu_{1,2}$=11 at reference numeral 320b, the reference numeral value $\mu_{2,1}$=9 at reference numeral 330a, and the value $\mu_{2,2}$=15 reference numeral 330b.

To simplify notation, all variances are assumed equal, and hence excluded from the calculations. All training weight factors $u_{m,k}$ are also assumed to equal, i.e., all training weight factors $u_{m,k}$=0.5. Given these weights and posterior probabilities the posterior probabilities as given in Table 1, the classification device 200a, 200b determines $\Psi_1^{opt} = \Psi_2^{opt} = 0.5 \cdot 0.85 + 0.5 \cdot 0.55 = 0.7$ by implementing Equation (12).

Assume that the input sequence x is divided into 10 input vectors $x_n$. Assume further that the input sequence x generates a higher value for the discriminative function of the first class $\omega_1$ than for the second class $\omega_2$. That is m*=1, according to Equation (4). Let the input sequence x have 9 out of 10 input vectors $x_n$, closer to $\mu_{1,2}$ and only one being closer to $\mu_{1,1}$, which leads to $v_{1,1}$=0.1 and $v_{1,2}$=0.9. Then, by the classification device 200a, 200b implementing Equation (13) and Equation (14) the values $\Psi_1$=0.58 and $\Omega_1$=0.8286 are obtained. Since most of the input vectors $x_n$ fall closest to $\mu_{1,2}$=11 (in a confusion region, i.e., where the classes $\omega_1$, $\omega_2$ are difficult to discriminate), the above determined uncertainty measure $\Omega$=0.8286 is regarded as being significantly lower than 1.

Figure 8:
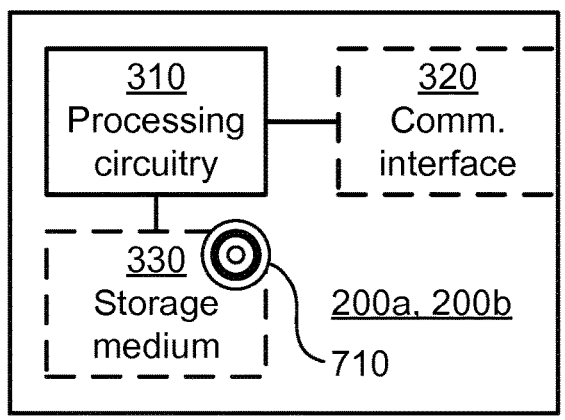
FIG. 8 is a schematic diagram showing functional units of a classification device 200a, 200b according to an embodiment.

FIG. 8 schematically illustrates, in terms of a number of functional units, the components of a classification device 200a, 200b according to an embodiment. Processing circuitry 310 is provided using any combination of one or more of a suitable central processing unit (CPU), multiprocessor, microcontroller, digital signal processor (DSP), etc., capable of executing software instructions stored in a computer program product 710 (as in FIG. 10), e.g. in the form of a storage medium 330. The processing circuitry 310 may further be provided as at least one application specific integrated circuit (ASIC), or field programmable gate array (FPGA).

Particularly, the processing circuitry 310 is configured to cause the classification device 200a, 200b to perform a set of operations, or steps, S102-S110, as disclosed above. For example, the storage medium 330 may store the set of operations, and the processing circuitry 310 may be configured to retrieve the set of operations from the storage medium 330 to cause the classification device 200a, 200b to perform the set of operations. The set of operations may be provided as a set of executable instructions.

Thus the processing circuitry 310 is thereby arranged to execute methods as herein disclosed. The storage medium 330 may also comprise persistent storage, which, for example, can be any single one or combination of magnetic memory, optical memory, solid state memory or even remotely mounted memory. The classification device 200a, 200b may further comprise a communications interface 320 configured for communications with another device, for example to obtain the short-term frequency representation as in step S102 and to provide as result of the uncertainty measure as determined in step S106. As such the communications interface 320 may comprise one or more transmitters and receivers, comprising analogue and digital components. The processing circuitry 310 controls the general operation of the classification device 200a, 200b e.g. by sending data and control signals to the communications interface 320 and the storage medium 330, by receiving data and reports from the communications interface 320, and by retrieving data and instructions from the storage medium 330. Other components, as well as the related functionality, of the classification device 200a, 200b are omitted in order not to obscure the concepts presented herein.

Figure 9:
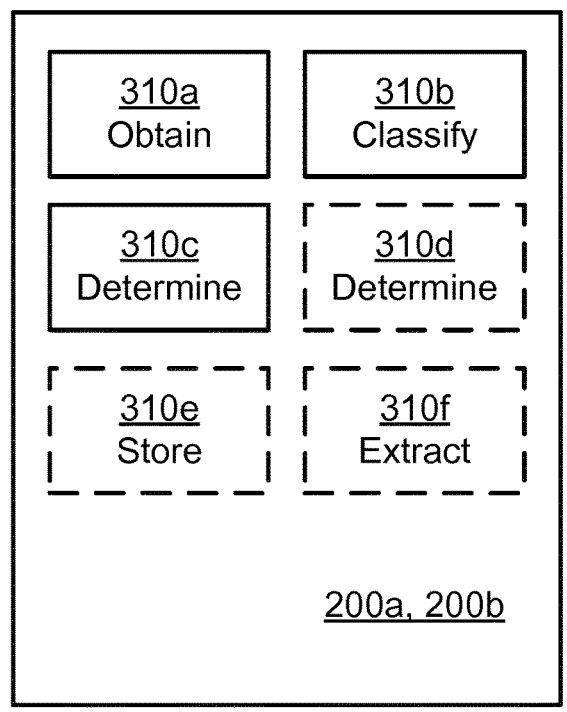
FIG. 9 is a schematic diagram showing functional modules of a classification device 200a, 200b according to an embodiment.

FIG. 9 schematically illustrates, in terms of a number of functional modules, the components of a classification device 200a, 200b according to an embodiment. The classification device 200a, 200b of FIG. 9 comprises a number of functional modules; an obtain module 310a configured to perform step S102, a classify module 310b configured to perform step S104, and a determine module 310c configured to perform step S106. The classification device 200a, 200b of FIG. 9 may further comprises a number of optional functional modules, such as any of a determine module 310d configured to perform step S108, a store module 310e configured to perform step S110, and an extract module 310f configured to perform step S102a. In general terms, each functional module 310a-310f may in one embodiment be implemented only in hardware or and in another embodiment with the help of software, i.e., the latter embodiment having computer program instructions stored on the storage medium 330 which when run on the processing circuitry 310 makes the classification device 200a, 200b perform the corresponding steps mentioned above in conjunction with FIGS. 5 and 7.

It should also be mentioned that even though the modules correspond to parts of a computer program, they do not need to be separate modules therein, but the way in which they are implemented in software is dependent on the programming language used. Preferably, one or more or all functional modules 310a-310f may be implemented by the processing circuitry 310, possibly in cooperation with functional units 320 and/or 330. The processing circuitry 310 may thus be configured to from the storage medium 330 fetch instructions as provided by a functional module 310a-310g and to execute these instructions, thereby performing any steps as disclosed above.

The classification device 200a, 200b may be provided as a standalone device or as a part of at least one further device. For example, the classification device 200a, 200b may be provided in an audio mining device. Alternatively, functionality of the classification device 200a, 200b may be distributed between at least two devices, or nodes. These at least two nodes, or devices, may either be part of the same network part or may be spread between at least two such network parts.

Thus, a first portion of the instructions performed by the classification device 200a, 200b may be executed in a first device, and a second portion of the of the instructions performed by the classification device 200a, 200b may be executed in a second device; the herein disclosed embodiments are not limited to any particular number of devices on which the instructions performed by the classification device 200a, 200b may be executed. Hence, the methods according to the herein disclosed embodiments are suitable to be performed by a classification device 200a, 200b residing in a cloud computational environment. Therefore, although a single processing circuitry 310 is illustrated in FIG. 8 the processing circuitry 310 may be distributed among a plurality of devices, or nodes. The same applies to the functional modules 310a-310f of FIG. 9 and the computer program 720 of FIG. 10 (see below).

Figure 10:
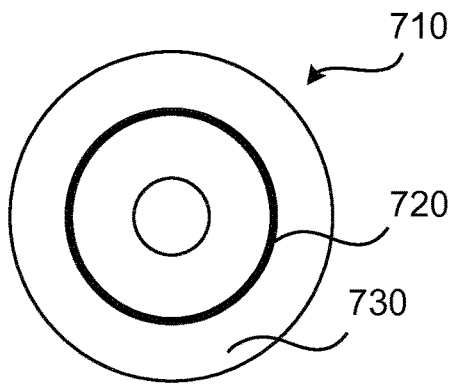
FIG. 10 shows one example of a computer program product comprising computer readable storage medium according to an embodiment.

FIG. 10 shows one example of a computer program product 710 comprising computer readable storage medium 730. On this computer readable storage medium 730, a computer program 720 can be stored, which computer program 720 can cause the processing circuitry 310 and thereto operatively coupled entities and devices, such as the communications interface 320 and the storage medium 330, to execute methods according to embodiments described herein. The computer program 720 and/or computer program product 710 may thus provide means for performing any steps as herein disclosed.

In the example of FIG. 10, the computer program product 710 is illustrated as an optical disc, such as a CD (compact disc) or a DVD (digital versatile disc) or a Blu-Ray disc. The computer program product 710 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 720 is here schematically shown as a track on the depicted optical disk, the computer program 720 can be stored in any way which is suitable for the computer program product 710.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

LIST OF ABBREVIATIONS

GMM Gaussian Mixture Model
pdf probability density function
x input sequence
$x_n$ n-th feature vector of the input sequence x
D dimensionality of the input vector x
m class index (out of total M classes)
$\omega_m$ class with index m
m* index of the best class in the log-likelihood sense
k cluster index (out of total K clusters in every class)
µ cluster mean
Σ cluster covariance
|Σ| determinant of the covariance matrix
u training weight factors (weight factors at training state)
v input weight factors (weight factors at classification stage)
$\Phi_{m,k}$ k-th component of m-th cluster
$P(\omega_m|\mu_{m,k})$ posterior probabilities (probability of class $\omega_m$ at cluster $\Phi_{m,k}$ with mean $\mu_{m,k}$)
$\Omega_{m*}$ uncertainty measure based on per-cluster posterior probabilities
$\Lambda_{m*}$ uncertainty measure based on global posterior probabilities

The invention claimed is:

1. A method for determining an uncertainty measure of a mixture-model based parametric classifier, the method being performed by a classification device, the method comprising:

obtaining a short-term frequency representation of a multimedia signal, the short-term frequency representation defining an input sequence x;

classifying the input sequence x to belong to one class $\omega_{m^*}$ of at least two available classes $\omega_1$, $\omega_2$ using the parametric classifier, the parametric classifier having been trained with a training sequence y; and determining an uncertainty measure of the classified input sequence x based on a relation between posterior probabilities of the input sequence x and posterior probabilities of the training sequence y; and outputting at least the class $\omega_{m^*}$ and the determined uncertainty measure corresponding to the class $\omega_{m^*}$ for transmission.

2. The method according to claim 1, wherein the uncertainty measure describes a deviation from an optimal performance of the parametric classifier.

3. The method according to claim 2, wherein the optimal performance is based on the posterior probabilities of the training sequence y.

4. The method according to claim 1, wherein the uncertainty measure is defined as minimum of 1 and a ratio between the posterior probabilities of the input sequence x and the posterior probabilities of the training sequence y.

5. The method according to claim 1, wherein there is one posterior probability of the input sequence x for each available class $\omega_1$, $\omega_2$, and wherein the posterior probability for a given class $\omega_m$ represents probability of said given class $\omega_m$ for the input sequence x.

6. The method according to claim 1, wherein there is one posterior probability of the training sequence y for each available class $\omega_1$, $\omega_2$, and wherein the posterior probability for a given class $\omega_m$ represents probability of the given class $\omega_m$ for the training sequence y.

7. The method according to claim 1, wherein the posterior probabilities of the input sequence x represent probability of classifying the input sequence x into class $\omega_m$ given the input sequence x, and wherein the posterior probabilities of the training sequence y represent probability of classifying the training sequence y into class $\omega_m$ given that the training sequence y belongs to class $\omega_m$.

8. The method according to claim 1, wherein the posterior probabilities are determined as weighted sum of respective per-cluster posterior probabilities.

9. The method according to claim 1, wherein each of the at least two available classes $\omega_1$, $\omega_2$ is associated with its own set of clusters.

10. The method according to claim 9, wherein the training sequence y is divided into training vectors $y_n$, and wherein the posterior probabilities of the training sequence y are based on training weight factors $u_{m,k}$ that represent how many of the training vectors $y_n$ are associated to each cluster $u_{m,k}$ of each class $\omega_m$.

11. The method according to claim 9, wherein the input sequence x is divided into input vectors $x_n$, and wherein the posterior probabilities of the input sequence x are based on input weight factors $v_{m^*,k}$ that represent how many of the input vectors $x_n$ are associated to each cluster $\Phi_{m,k}$ of said the one class $\omega_{m^*}$ to which the input sequence x has been classified to belong, normalized with a total length of the input sequence x.

12. The method according to claim 1, further comprising: determining, for each cluster $\Phi_{m,k}$, a relation between the input weight factors and the training weight factors for the one class $\omega_{m^*}$ to which the input sequence x has been classified to belong; and storing the relation.

13. The method according to claim 1, wherein the parametric classifier is based on Gaussian Mixture Models, GMMs.

14. The method according to claim 1, wherein each of the at least two available classes $\omega_1$, $\omega_2$ represents one of a unique language, a unique speaker, and a unique gender.

15. The method according to claim 1, wherein the short-term frequency representation is provided by mel-frequency cepstral components, MFCCs.

16. The method according to claim 15, further comprising:

extracting the MFCCs from an audio waveform of the multimedia signal.

17. The method according to claim 16, wherein the MFCCs are represented by MFCC vectors, wherein the audio waveform is composed of frames, and wherein there is one MFCC vector per frame.

18. The method according to claim 1, wherein the obtaining, the classifying, and the determining are performed in an audio mining application.

19. A classification device for determining an uncertainty measure of a mixture-model based parametric classifier, the classification device comprising processing circuitry, the processing circuitry being configured to cause the classification device to:

obtain a short-term frequency representation of a multimedia signal, the short-term frequency representation defining an input sequence x;

classify the input sequence x to belong to one class $\omega_{m^*}$ of at least two available classes $\omega_1$, $\omega_2$ using the parametric classifier, the parametric classifier having been trained with a training sequence y; and determine an uncertainty measure of the classified input sequence x based on a relation between posterior probabilities of the input sequence x and posterior probabilities of the training sequence y; and output at least the class $\omega_{m^*}$ and the determined uncertainty measure corresponding to the class $\omega_{m^*}$ for transmission.

20. A non-transitory computer storage medium storing a computer program for determining an uncertainty measure of a mixture-model based parametric classifier, the computer program comprising computer code which, when run on processing circuitry of a classification device, causes the classification device to:

obtain a short-term frequency representation of a multimedia signal, the short-term frequency representation defining an input sequence x;

classify the input sequence x to belong to one class $\omega_{m^*}$ of at least two available classes $\omega_1$, $\omega_2$ using the parametric classifier, the parametric classifier having been trained with a training sequence y; and determine an uncertainty measure of the classified input sequence x based on a relation between posterior probabilities of the input sequence x and posterior probabilities of the training sequence y; and output at least the class $\omega_{m^*}$ and the determined uncertainty measure corresponding to the class $\omega_{m^*}$ for transmission.

* * * * *